Oct. 26, 1965   J. BAUDE   3,214,642
ANTIPUMPING CONTROL SYSTEM
Filed Aug. 2, 1962
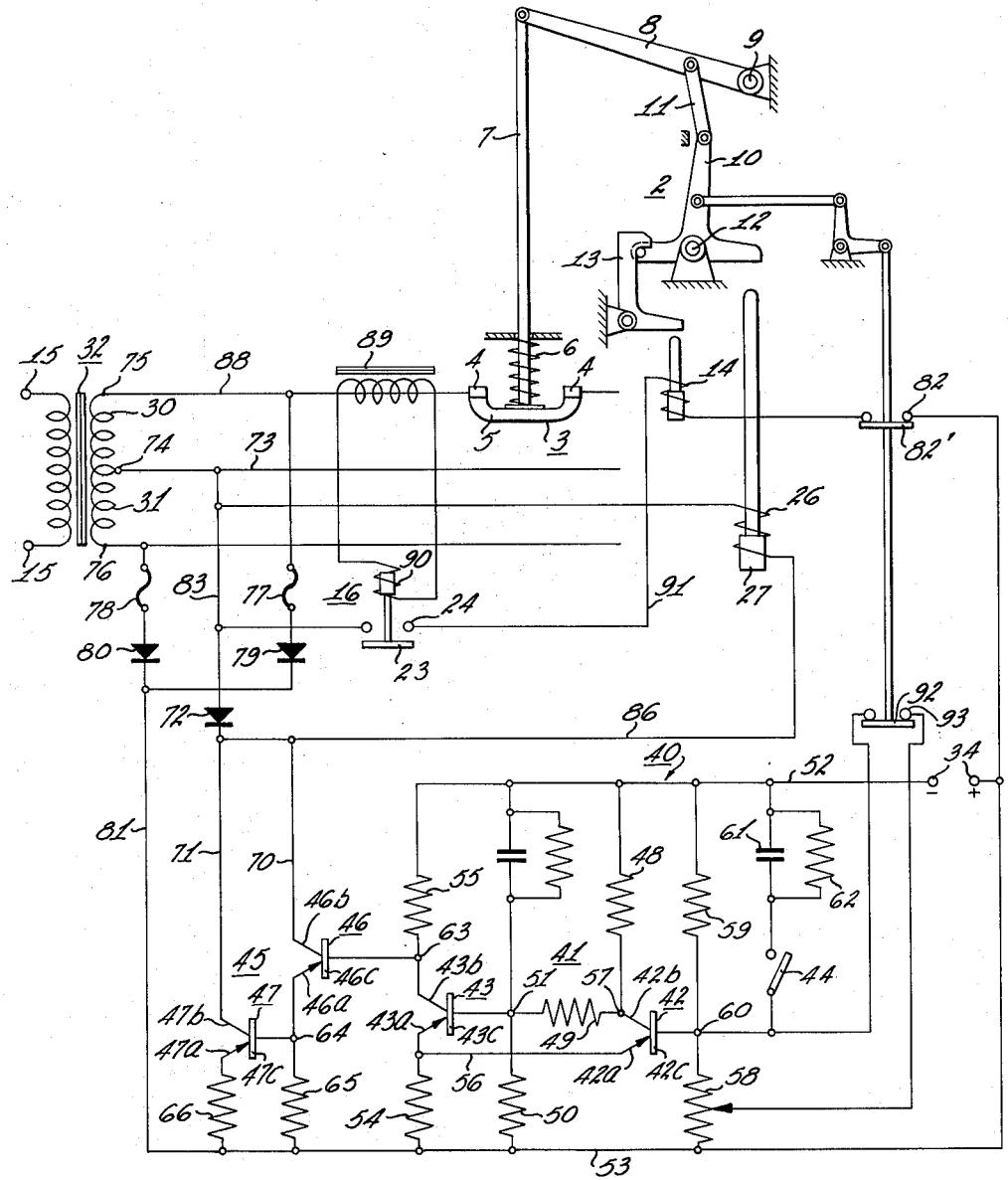
INVENTOR
JOHN BAUDE
BY Robert B. Benson
ATTORNEY United States Patent Office 3,214,642
Patented Oct. 26, 1965

3,214,642
ANTIPUMPING CONTROL SYSTEM
John Baude, Milwaukee, Wis., assignor to Allis-Chalmers
Manufacturing Company, Milwaukee, Wis.
Filed Aug. 2, 1962, Ser. No. 214,344
6 Claims. (Cl. 317—54)

This invention relates to control systems and more particularly to one shot closing control circuits for high speed circuit breakers.

A satisfactory control system for a modern power circuit breaker should perform several functions in addition to opening and closing the breaker. These functions are as follows:

(1) Energize the closing circuit long enough to insure complete closing even though the initiating contact is only momentarily closed.

(2) Deenergize the closing circuit to cut off the closing power just as the circuit breaker is fully closed.

(3) Prevent pumping.

(4) Provide electrically trip free operation.

The term pumping is commonly used to refer to unintentional repetitive opening and closing operations of a breaker, while the initiating switch or closing control switch contact is held closed. Unless means are provided to prevent pumping, such operations can occur when a breaker is closed on a faulted line and resulting damage is probable if the fault current is high. The closing control of a circuit breaker should be such that it will close the circuit breaker only once for each operation of the closing control switch.

In the prior art, pumping was controlled or eliminated by using a two relay control scheme which utilized a main control relay usually designated "X" and an auxiliary control relay usually designated "Y." Part of the function of the auxiliary or "Y" relay in the circuit has been to provide trip free operation and to prevent pumping. It is desirable also to provide a control system with fewer contacts than the prior art "X," "Y" systems. The new arrangement should provide more positive sequence of action between the closing circuit deenergizing means and the antipumping device by combining these structures in a single device and should eliminate possible functional failure of the antipumping means caused by imperfect operation of the relay due to shock of circuit breaker operation at the time the control relay is attempting to seal in.

In accordance with the invention disclosed a new and improved control arrangement for energizing a load circuit is provided. This energizing arrangement comprises a first solid state device electrically interconnecting the load and a source of electric power. Means are provided for controlling the first solid state device. This means comprises a source of control power, and a bistable second solid state device. The second solid state device interconnects a source of control power to the first solid state device. Switching means are provided for energizing the second solid state device from the source of control power to render the first solid state device conductive to energize the load. Further, switching means are provided actuatable upon energization of the load for changing the condition of the second solid state device without disconnecting the source of control power from the second solid state device.

It is therefore one object of the present invention to provide a new and improved control system for circuit breakers in which unintentional repetitive opening and closing operations of a circuit breaker are prevented.

Another object of this invention is to provide a new and improved closing control system for a circuit breaker in which the circuit breaker contacts close only once for each operation of a control switch.

A further object of this invention is to provide a new and improved circuit breaker operating mechanism in which circuit breaker control is obtained with a minimum of parts.

A further object of this invention is to provide a new and improved electronic ultra-high speed antipumping control for a closing coil of a circuit breaker structure.

Other objects and advantages of the invention will become apparent from the following description when read in connection with the accompanying drawing, in which:

The figure is a diagrammatic view of a circuit breaker, a control circuit and operating mechanism embodying the present invention.

As diagrammatically shown in the figure, the circuit breaker 3 comprises a pair of stationary contact members 4 and a movable contact member 5. The circuit breaker is biased to open circuit position by means of accelerating spring 6. The movable contact member 5 is supported by a breaker rod 7 which, in turn, is supported by lever 8 pivoted at 9. Lever 8 is connected to bell crank 10 by means of rod 11. Bell crank 10 is pivoted at 12 and forms part of linkage 2. The circuit breaker is shown in the closed position and is held there by a latch 13.

Releasing or tripping the latch will open the breaker. This may be done manually or it may be done electrically by the tripping solenoid 14 or automatically on occurrence of fault on the power line 15 by means of fault responsive relay 16. Solenoid 14 actuates latch 13 counterclockwise to release the linkage 2 to cause separation of contacts 4 and 5 of circuit breaker 3. Linkage 2 may be made of any suitable known type and may be mechanically trip free. The fault responsive relay 16 comprises a movable contact 23 which engages a pair of stationary contacts 24.

The solenoid operating closing mechanism comprises coil 26 and armature 27. Upon energization of coil 26, armature 27 is actuated to drive circuit breaker 3 to its closed position.

The electrical energy needed for energizing the load or closing coil 26 is obtained from two sources, namely, the transformer 32 comprising winding sections 30 and 31 connected across the power source 15 and direct current source 34. Source 34 is used to trigger into conduction the control system 40 comprising a suitable flip-flop switching arrangement 41 which may comprise a Schmitt trigger employing a pair of solid state or semiconductor devices which may be, for example, transistors 42 and 43. The Schmitt trigger is a regenerative bistable circuit whose state depends on the amplitude of the input voltage from source 34. Upon a predetermined change of the state of the flip-flop arrangement 41 upon closing of switch 44 connecting source 34 thereto, another switching arrangement 45 comprising solid state or semiconductor devices, such as for example, transistors 46 and 47, is rendered conductive to electrically connect coil 26 across the secondary winding section 31 of transformer 32.

Transistors 42 and 43 each comprise emitters 42a, 43a, collectors 42b, 43b and bases 42c, 43c, respectively. Base 43c is connected to a voltage divider comprising suitable resistors 48, 49 and 50 at a point 51. Resistors 48, 49 and 50 are connected in series arrangement across direct current source 34 through conductors 52 and 53. Emitter 43a and collector 43b of transistor 43 are connected in series across conductors 52 and 53 with biasing resistor 54 connected between emitter 43a and conductor 53 and biasing resistor 55 connected between collector 43b and conductor 52.

The emitters 42a and 43a of transistors 42 and 43 are interconnected by a conductor 56. Collector 42b of transistor 42 is connected to the voltage divider comprising resistors 48, 49 and 50 at a point 57 between resistors 48 and 49. A biasing network comprising resistors 58 and 59 are connected in series across conductors 52 and 53, as shown in FIG. 1 with base 42c of transistor 42 connected at a point 60 between these resistors.

In order to prevent pumping of the circuit breaker structure, temporary control current flow through switch 44 is provided by the introduction of capacitor 61 and shunting discharge resistor 62 in series circuit with switch 44 between base 42c and conductor 52. Capacitor 61 passes current the moment switch 44 is closed which current flow is substantially reduced when capacitor 61 is fully charged. This provides for antipumping control in case the circuit breaker contact 4 and 5 should close on a short circuit. If switch 44 is opened, capacitor 61 will discharge through resistor 62 and control 40 is then ready for another closing operation.

The switching transistors 46 and 47 are utilized to connect the source of power 15 across transformer 32 to closing coil 26. Although two transistors are shown, only one may be used if it is of a sufficient current rating.

Transistors 46 and 47 comprise emitters 46a, 47a, collectors 46b, 47b and bases 46c, 47c. Base 46c is connected at point 63 to collector 43b of transistor 43. Emitter 46a of transistor 46 is connected to base 47c of transistor 47 at point 64 and through a biasing resistor 65 to conductor 53. Emitter 47a of transistor 47 is connected through a biasing resistor 66 to conductor 53. Collectors 46b and 47b are connected in parallel through conductors 70 and 71, respectively, through the parallel arrangement of diode 72 and coil 26 to conductor 73 which is connected to the common midpoint 74 of the secondary winding sections 30 and 31 of transformer 32. The terminals 75 and 76 of the secondary winding sections 30 and 31 of transformer 32 each are connected in parallel through fuses 77, 78 and diodes 79 and 80 to conductor 81 which is connected to conductor 53. Conductor 53 is connected to one terminal of the direct current source 34 and through a pair of contacts 82, 82', tripping coil 14, contacts 23, 24 of solenoid 16, conductors 83 and 73 to terminal 74 of transformer 32. Contacts 82, 82' are actuated to contact open position upon opening of the circuit breaker contacts and to contact closed position upon closing of the contacts.

The operation of the circuit shown in the figure is as follows: the direct current source 34 energizes conductor 52 and current flows from conductor 52 through the voltage divider comprising resistors 48, 49 and 50 to conductor 53 biasing base 43c of transistor 43 sufficiently negative to render transistor 43 conductive. Current then flows from conductor 52 through resistor 55, collector 43b, emitter 43a of transistor 43 and resistor 54 to conductor 53. This current flow through transistor 43 cuts off or renders nonconductive transistors 46 and 47.

Upon closing of switch 44, when contacts 92 and 93 are open, current flows from conductor 52 through capacitor 61, switch 44, resistor 58 to conductor 53. This current flow which may be merely a pulse in length continues until the capacitor is fully charged. Such current flow renders transistor 42 conductive causing current to flow from conductor 52 through resistor 48, collector 42b and emitter 42a of transistor 42, conductor 56, resistor 54 to conductor 53. This current flow renders the base 43c of transistor 43 more positive and transistor 43 nonconductive. The interruption of current flow through transistor 43 renders base 46c of transistor 46 more negative and substantially simultaneously transistors 46 and 47 conductive.

Upon transistors 46 and 47 being rendered conductive current flows from terminal 74 forming the common terminal of winding sections 30 and 31 of transformer 32 through conductor 73, closing coil 26, conductor 86, the parallel circuits comprising conductor 70, collector 46b, emitter 46a of transistor 46, resistor 65, and conductor 71, collector 47b, emitter 47a of transistor 47 and resistor 66, conductor 53, conductor 81 and to either terminal 75 or 76 of winding sections 30 and 31 of transformer 32. Energization of coil 26 causes armature 27 of the solenoid operating mechanism to close the arcing contacts of the circuit breaker.

Opening of the arcing contacts may occur upon an overcurrent in conductor 88 of the power supply controlled by contacts 4 and 5 of circuit breaker 3 which is sensed by the overcurrent transformer 89. Predetermined overcurrent flow in transformer 89 energizes coil 90 of relay 16 closing relay contacts 23 and 24 to complete a circuit from terminal 74 of winding sections 30 and 31 of transformer 32, conductor 73 and 83, contacts 23 and 24 of relay 16, conductor 91, tripping coil 14, contacts 82, 82', conductors 53 and 81 to either terminal 75 and 76 of winding sections 30 and 31 through either diode 79, fuse 77 or diode 80 and fuse 78, respectively.

When the circuit breaker is in contact closed position, contacts 92 and 93 associated with the circuit breaker contact actuating means are in closed position shorting out part of resistor 58 as shown in the figure. Upon closing of switch 44 during a circuit breaker closing operation when the circuit breaker and contacts 92 and 93 are open, base 42c of transistor 42 is rendered sufficiently negative to make the transistor conductive and any subsequent closing of contacts 92 and 93 upon closing of the arcing contacts increases the effective resistance created by resistor 58 to change the potential on base 42c to render transistor 42 nonconductive. In the nonconductive condition of transistor 42, contacts 92 and 93 can be opened which occurs upon opening of the circuit breaker, without rendering transistor 42 conductive.

Thus, the bistable flip-flop can be changed from one state to another by closing switch 44 to energize closing coil 26 of the solenoid contact closing mechanism and can be flipped back to its original condition by the closing of contacts 92 and 93. The flip-flop circuit now stays in this nonconductive condition until contacts 92 and 93 and switch 44 are opened and capacitor 61 is discharged through resistor 62. Upon reclosing of switch 44 a further closing operation of the breaker may again occur.

It is intended to be within the scope of this invention to use other types of semiconductors in place of the transistors forming the bistable flip-flop circuit. For example, silicon controlled rectifiers and tunnel diodes may be used since they have two stable states and must be energized in a predetermined manner to be flipped from one condition to another.

Although but a few embodiments of the present invention have been illustrated and described it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A control system for energizing a closing device for a circuit breaker comprising:
   semiconductor switching means connected between an electrical energy source and the closing device for energizing the closing device when turned on;
   a switching device connected in a circuit with a control power source and the semiconductor switching means;
   control means connected in the circuit of the control power source and the switching device responsive to the closing of the switching device for turning on the semiconductor switching means upon closing of the switching device for a duration sufficient to operate the closing device, and for keeping the semiconductor switching means turned off for a period of time after opening of the switching device regardless of the position of the switching device; and
   means responsive to the position of the circuit breaker for keeping the semiconductor switching means turned off when the circuit breaker is closed regardless of the position of the switching device.

2. A control system for energizing a closing device for a circuit breaker comprising:
- a semiconductor switching circuit connected between an electrical energy source and the closing device and connected to energize the closing device when turned on;
- a closing switch connected in a circuit between a control electrical power source and the semiconductor switching circuit;
- control means connected in the circuit of the control power source and the closing switch, said control means comprising a parallel resistance-capacitance circuit connected between the control power source and the closing switch to pass current to turn on the semiconductor switching circuit upon closing of the closing switch for a duration sufficient to operate the closing device wherein said capacitance becomes charged to turn off the semiconductor switching circuit after said duration and keep it turned off as long as the closing switch remains closed and wherein said capacitance discharges through the resistance upon opening of the closing switch to keep the semiconductor switching circuit turned off for a period of time after opening of the closing switch regardless of the position of the closing switch; and
- means responsive to the position of the circuit breaker for keeping the semiconductor switching circuit turned off when the circuit breaker is closed regardless of the position of the switching device.

3. A control system for energizing a closing device for a circuit breaker comprising:
- a transistor switching circuit connected between an electrical energy source and the closing device and connected to energize the closing device when turned on;
- a switching device connected in a circuit between a control electrical power source and the transistor switching circuit;
- a parallel resistance-capacitance circuit connected between the control power source and the switching device to pass current to turn on the transistor switching circuit upon closing of the switching device for a duration sufficient to operate the closing device wherein said capacitance becomes charged to turn off the transistor switching circuit after said duration and keep it turned off as long as the switching device remains closed and wherein said capacitance discharges upon opening of the switching device to keep the transistor switching circuit turned off until the capacitance discharges to a predetermined level; and
- means connected to the transistor switching circuit and the circuit breaker responsive to the position of the circuit breaker to keep the transistor switching circuit turned off when the circuit breaker is closed regardless of the position of the switching device.

4. A control system for energizing a closing device for a circuit breaker comprising:
- a transistor switching circuit connected between an electrical source and the closing device for energizing said closing device when turned on, said transistor switching circuit having an input circuit and responsive to an input of one level to turn on and to an input of another level less than said one level to turn off;
- electrical energy source means connected to provide the input levels to the transistor switching circuit;
- means responsive to the position of the circuit breaker for connecting the transistor switching circuit input circuit to the electrical energy source means to receive an input of said other level when the circuit breaker is closed, and for connecting said input circuit to receive an input having a level intermediate said one and another level when the circuit breaker is open, said intermediate level selected to keep the transistor switching turned off; and
- a switching device and control means connected in circuit with the transistor switching circuit input circuit and the electrical energy source means for providing an input of said one level for a duration sufficient to energize the closing device when the switching device is closed and for providing an input of less than said one level thereafter until the switching device has been opened a predetermined minimum time.

5. A control system for energizing a closing device for a circuit breaker comprising:
- a transistor switching circuit connected between an electrical source and the closing device for energizing said closing device when turned on, said transistor switching circuit having an input circuit and responsive to an input of one level to turn on and to an input of another level less than said one level to turn off;
- control electrical energy source means connected to provide the input levels to the transistor switching circuit;
- means responsive to the position of the circuit breaker for connecting the transistor switching circuit input circuit to the control source means to receive an input of said other level when the circuit breaker is closed, and for connecting said input circuit to receive a level intermediate said one and another levels when the circuit breaker is open, said intermediate level selected to keep the transistor switching turned off; and
- a switching device and a parallel resistance-capacitance circuit connected in series with each other between the transistor switching circuit input circuit and the one level of the electrical energy source means.

6. A control system for energizing a closing device for a circuit breaker comprising:
- a transistor switching circuit connected between an electrical source and the closing device for energizing said closing device when turned on, said transistor switching circuit having an input circuit and responsive to a negative input to turn on and to a positive input to turn off;
- a control electrical energy source having a positive and negative terminal;
- means responsive to the position of the circuit breaker for connecting the transistor switching circuit input circuit to the positive terminal when the circuit breaker is closed, and for connecting said input circuit to a level intermediate the positive and negative terminal when the circuit breaker is open; and
- a switching device and a parallel resistance-capacitance circuit connected in series with each other between the transistor switching circuit input circuit and the negative terminal.

References Cited by the Examiner

UNITED STATES PATENTS

| | | | |
|---|---|---|---|
| 2,845,583 | 7/58 | Reuther et al. | 317—54 |
| 2,909,707 | 10/59 | Derr et al. | 317—54 |
| 3,106,666 | 10/63 | Kuckens et al. | 317—142 |

SAMUEL BERNSTEIN, *Primary Examiner.*